United States Patent
Varadarajan et al.

(10) Patent No.: US 8,792,789 B1
(45) Date of Patent: Jul. 29, 2014

(54) OPTIMIZED CHROMATIC DISPERSION FILTER

(75) Inventors: Badri Varadarajan, Mountain View, CA (US); Daruish Dabiri, San Jose, CA (US); Subhash Roy, Lexington, MA (US)

(73) Assignee: Applied Micro Circuits Corporation, Sunnyvale, CA (US)

( * ) Notice: Subject to any disclaimer, the term of this patent is extended or adjusted under 35 U.S.C. 154(b) by 162 days.

(21) Appl. No.: 13/413,705

(22) Filed: Mar. 7, 2012

(51) Int. Cl.
*H04B 10/00* (2013.01)
*H04B 10/06* (2006.01)

(52) U.S. Cl.
USPC .......................... 398/159; 398/205; 398/208

(58) Field of Classification Search
USPC ................. 398/136, 149, 158, 202, 208, 210
See application file for complete search history.

(56) References Cited

U.S. PATENT DOCUMENTS

| | | | |
|---|---|---|---|
| 2005/0195893 A1* | 9/2005 | Brunn et al. | 375/232 |
| 2012/0063532 A1* | 3/2012 | Yoshimoto et al. | 375/285 |
| 2012/0106982 A1* | 5/2012 | Wagner et al. | 398/208 |

* cited by examiner

*Primary Examiner* — David Payne
*Assistant Examiner* — Casey Kretzer
(74) *Attorney, Agent, or Firm* — Amin, Turocy & Watson, LLP (57) ABSTRACT

A method is provided for performing chromatic dispersion (CD) compensation. A zero-forcing filter is calculated with a number of taps (n) required to nullify a chromatic dispersion frequency response of an optical channel. The number of taps in the zero-forcing filter is truncated to a number equal to (n−x), where x is an integer greater than 0. In one aspect, the chromatic dispersion frequency response of the optical channel is partitioned into a plurality of constituent chromatic dispersion responses, and a zero-forcing filter is calculated for each of the plurality of constituent chromatic dispersion responses. The number of taps in each of the plurality of zero-forcing filters is truncated, and the CD compensation filter is formed for each of the plurality of truncated tap zero-forcing filters. In another aspect, the tap values of the zero-forcing filter are quantized to a finite quantization set.

14 Claims, 11 Drawing Sheets

| TEST | FIXED PARAMETERS | VARIABLE | MEASUREMENT | PURPOSE |
|---|---|---|---|---|
| CHROMATIC DISPERSION COMPENSATION REQD | Tx POWER = 0 dBm CD ON PMD OFF, NON-LINEARITY OFF | TOTAL FIBER LENGTH (200, 500, 2000, 4000 km) | BER, SNR FOR VARIOUS CD COMPENSATION FILTER LENGTHS | ESTIMATE REQUIRED FILTER LENGTH -> COMPLEXITY |

OPTIMIZED CHROMATIC DISPERSION FILTER

BACKGROUND OF THE INVENTION

1. Field of the Invention

This invention generally relates to optical communications and, more particularly, to a filter for efficiently compensating chromatic dispersion in an optical communications channel.

2. Description of the Related Art

Wikipedia notes that in optics, dispersion is the phenomenon in which the phase velocity of a wave depends on its frequency, or alternatively when the group velocity depends on the frequency. Media having such a property are termed dispersive media. Dispersion is sometimes called chromatic dispersion to emphasize its wavelength-dependent nature, or group-velocity dispersion (GVD) to emphasize the role of the group velocity.

The most familiar example of dispersion is probably a rainbow, in which dispersion causes the spatial separation of a white light into components of different wavelengths (different colors). However, dispersion also has an effect in many other circumstances: for example, GVD causes pulses to spread in optical fibers, degrading signals over long distances; also, a cancellation between group-velocity dispersion and nonlinear effects leads to soliton waves.

There are generally two sources of dispersion: material dispersion and waveguide dispersion. Material dispersion comes from a frequency-dependent response of a material to waves. For example, material dispersion leads to undesired chromatic aberration in a lens or the separation of colors in a prism. Waveguide dispersion occurs when the speed of a wave in a waveguide (such as an optical fiber) depends on its frequency for geometric reasons, independent of any frequency dependence of the materials from which it is constructed. More generally, "waveguide" dispersion can occur for waves propagating through any inhomogeneous structure (e.g., a photonic crystal), whether or not the waves are confined to some region. In general, both types of dispersion may be present, although they are not strictly additive. Their combination leads to signal degradation in optical fibers for telecommunications, because the varying delay in arrival time between different components of a signal "smears out" the signal in time.

The phase velocity, v, of a wave in a given uniform medium is given by $$v = \frac{c}{n}$$

where c is the speed of light in a vacuum and n is the refractive index of the medium.

In general, the refractive index is some function of the frequency f of the light, thus $n=n(f)$, or alternatively, with respect to the wave's wavelength $n=n(\lambda)$. The wavelength dependence of a material's refractive index is usually quantified by its Abbe number or its coefficients in an empirical formula such as the Cauchy or Sellmeier equations.

Because of the Kramers-Kronig relations, the wavelength dependence of the real part of the refractive index is related to the material absorption, described by the imaginary part of the refractive index (also called the extinction coefficient). In particular, for non-magnetic materials ($\mu=\mu_0$), the susceptibility X that appears in the Kramers-Kronig relations is the electric susceptibility $X_e = n^2 - 1$.

Since that refractive index varies with wavelength, it follows that the angle by which the light is refracted will also vary with wavelength, causing an angular separation of the colors known as angular dispersion.

For visible light, refraction indices n of most transparent materials (e.g., air, glasses) decrease with increasing wavelength $\lambda$:

$$1 < n(\lambda_{red}) < n(\lambda_{yellow}) < n(\lambda_{blue}),$$

or alternatively:

$$\frac{dn}{d\lambda} < 0.$$

In this case, the medium is said to have normal dispersion. Whereas, if the index increases with increasing wavelength (which is typically the case for X-rays), the medium is said to have anomalous dispersion.

At the interface of such a material with air or vacuum (index of ~1), Snell's law predicts that light incident at an angle $\theta$ to the normal will be refracted at an angle arcsin(sin ($\theta$)/n). Thus, blue light, with a higher refractive index, will be bent more strongly than red light, resulting in the well-known rainbow pattern.

Another consequence of dispersion manifests itself as a temporal effect. The formula $v=c/n$ calculates the phase velocity of a wave; this is the velocity at which the phase of any one frequency component of the wave will propagate. This is not the same as the group velocity of the wave, which is the rate at which changes in amplitude (known as the envelope of the wave) will propagate. For a homogeneous medium, the group velocity $v_g$ is related to the phase velocity by (here $\lambda$ is the wavelength in vacuum, not in the medium):

$$v_g = c\left(n - \lambda \frac{dn}{d\lambda}\right)^{-1}.$$

The group velocity $v_g$ is often thought of as the velocity at which energy or information is conveyed along the wave. In most cases this is true, and the group velocity can be thought of as the signal velocity of the waveform. In some unusual circumstances, called cases of anomalous dispersion, the rate of change of the index of refraction with respect to the wavelength changes sign, in which case it is possible for the group velocity to exceed the speed of light ($v_g > c$). Anomalous dispersion occurs, for instance, where the wavelength of the light is close to an absorption resonance of the medium. When the dispersion is anomalous, however, group velocity is no longer an indicator of signal velocity. Instead, a signal travels at the speed of the wavefront, which is c irrespective of the index of refraction.

The group velocity itself is usually a function of the wave's frequency. This results in group velocity dispersion (GVD), which causes a short pulse of light to spread in time as a result of different frequency components of the pulse travelling at different velocities. GVD is often quantified as the group delay dispersion parameter (again, this formula is for a uniform medium only):

$$D = -\frac{\lambda}{c}\frac{d^2 n}{d\lambda^2}.$$

If D is less than zero, the medium is said to have positive dispersion. If D is greater than zero, the medium has negative dispersion.

If a light pulse is propagated through a normally dispersive medium, the result is the higher frequency components travel slower than the lower frequency components. The pulse therefore becomes positively chirped, or up-chirped, increasing in frequency with time. Conversely, if a pulse travels through an anomalously dispersive medium, high frequency components travel faster than the lower ones, and the pulse becomes negatively chirped, or down-chirped, decreasing in frequency with time.

The result of GVD, whether negative or positive, is ultimately temporal spreading of the pulse. Equivalently, GVD constitutes a linear channel whose frequency response can be closely approximated as $$H_{CD}(w) = \exp\left(-j\frac{D\lambda^2}{4\pi c}L(w-w_S)^2\right),$$

where w represents the angular frequency, $w_s$ is the center frequency of the band of interest, c is the speed of light, and L is the length of the fiber travelled by the communication signal. Note that in time domain, the above channel response has significant length, implying that a single impulse entering the fiber is dispersed broadly over time.

This makes dispersion management extremely important in optical communications systems based on optical fiber, since if dispersion is too high, a group of pulses representing a bit-stream will spread in time and merge together, rendering the bit-stream unintelligible. This phenomenon limits the length of fiber that a signal can be sent down without regeneration. One possible answer to this problem is to send signals down the optical fiber at a wavelength where the GVD is zero (e.g., around 1.3-1.5 μm in silica fibers), so pulses at this wavelength suffer minimal spreading from dispersion—in practice, however, this approach causes more problems than it solves because zero GVD unacceptably amplifies other non-linear effects (such as four wave mixing). Instead, the solution that is currently used in practice is to perform dispersion compensation, typically by matching the fiber with another fiber of opposite-sign dispersion so that the dispersion effects cancel; such compensation is ultimately limited by nonlinear effects such as self-phase modulation, which interact with dispersion to make it very difficult to undo. Note that this method of compensation is performed optically, by using dispersion compensating fiber.

A third method is to perform dispersion compensation in the electronic domain. Since the dispersion is equivalently represented by a filter, it can be compensated by filtering at the transmitter or receiver. In order to enable such electronic dispersion compensation, communication is coherent, i.e., the optical front end preserves magnitude and phase information, which are both used by the electronics to perform dispersion compensation filtering.

In addition to chromatic dispersion, optical fibers also exhibit model dispersion caused by a waveguide (i.e. optical fiber) having multiple modes at a given frequency, each with a different speed. A special case of this is polarization mode dispersion (PMD), which comes from a superposition of two modes that travel at different speeds due to random imperfections that break the symmetry of the waveguide.

When a broad range of frequencies (a broad bandwidth) is present in a single wavepacket, such as in an ultrashort pulse or a chirped pulse or other forms of spread spectrum transmission, it may not be accurate to approximate the dispersion by a constant over the entire bandwidth, and more complex calculations are required to compute effects such as pulse spreading.

In particular, the dispersion parameter D defined above is obtained from only one derivative of the group velocity. Higher derivatives are known as higher-order dispersion. These terms are simply a Taylor series expansion of the dispersion relation $\beta(\omega)$ of the medium or waveguide around some particular frequency. Their effects can be computed via numerical evaluation of Fourier transforms of the waveform, via integration of higher-order slowly varying envelope approximations, by a split-step method (which can use the exact dispersion relation rather than a Taylor series), or by direct simulation of the full Maxwell's equations rather than an approximate envelope equation.

Coherent receivers perform both chromatic dispersion compensation using digital signal processing (DSP) of the analog-to-digital (ADC) output. Since long haul systems have large chromatic dispersion, the processing is complex and power-hungry.

It would be advantageous if the architectures and processes needed for CD compensation could be made less complex, without significantly reducing the bit error rate (BER) performance.

SUMMARY OF THE INVENTION

Accordingly, a method is provided for performing chromatic dispersion (CD) compensation. The method calculates a zero-forcing filter with a number of taps (n) required to nullify a chromatic dispersion frequency response of an optical channel. The number of taps in the zero-forcing filter is truncated to a number equal to (n−x), where x is an integer greater than 0. The truncated zero-forcing filter is used to form a CD compensation filter.

In one aspect, the chromatic dispersion frequency response of the optical channel is partitioned into a plurality of constituent chromatic dispersion responses, and a zero-forcing filter is calculated for each of the plurality of constituent chromatic dispersion responses. The number of taps in each of the pluralityy of zero-forcing filters is truncated, and the CD compensation filter is formed for each of the plurality of truncated tap zero-forcing filters.

In another aspect, a zero-forcing filter is calculated with a number of taps (n) required to nullify a chromatic dispersion frequency response of an optical channel. The tap values of the zero-forcing filter are quantized to a finite quantization set, and the finite quantization set of tap values is used to form a CD compensation filter. As above, the chromatic dispersion frequency response of the optical channel may be partitioned into a plurality of constituent chromatic dispersion responses with a zero-forcing filter calculated for each of the plurality of constituent chromatic dispersion responses. Then, the CD compensation filter is formed using the quantized set of tap values for each of the plurality of zero-forcing filters, and cascading the plurality of CD compensation filters.

Additional details of the above-described methods, CD compensation systems, and an optical receiver with a CD compensation system are presented below.

DETAILED DESCRIPTION

Figure 1:
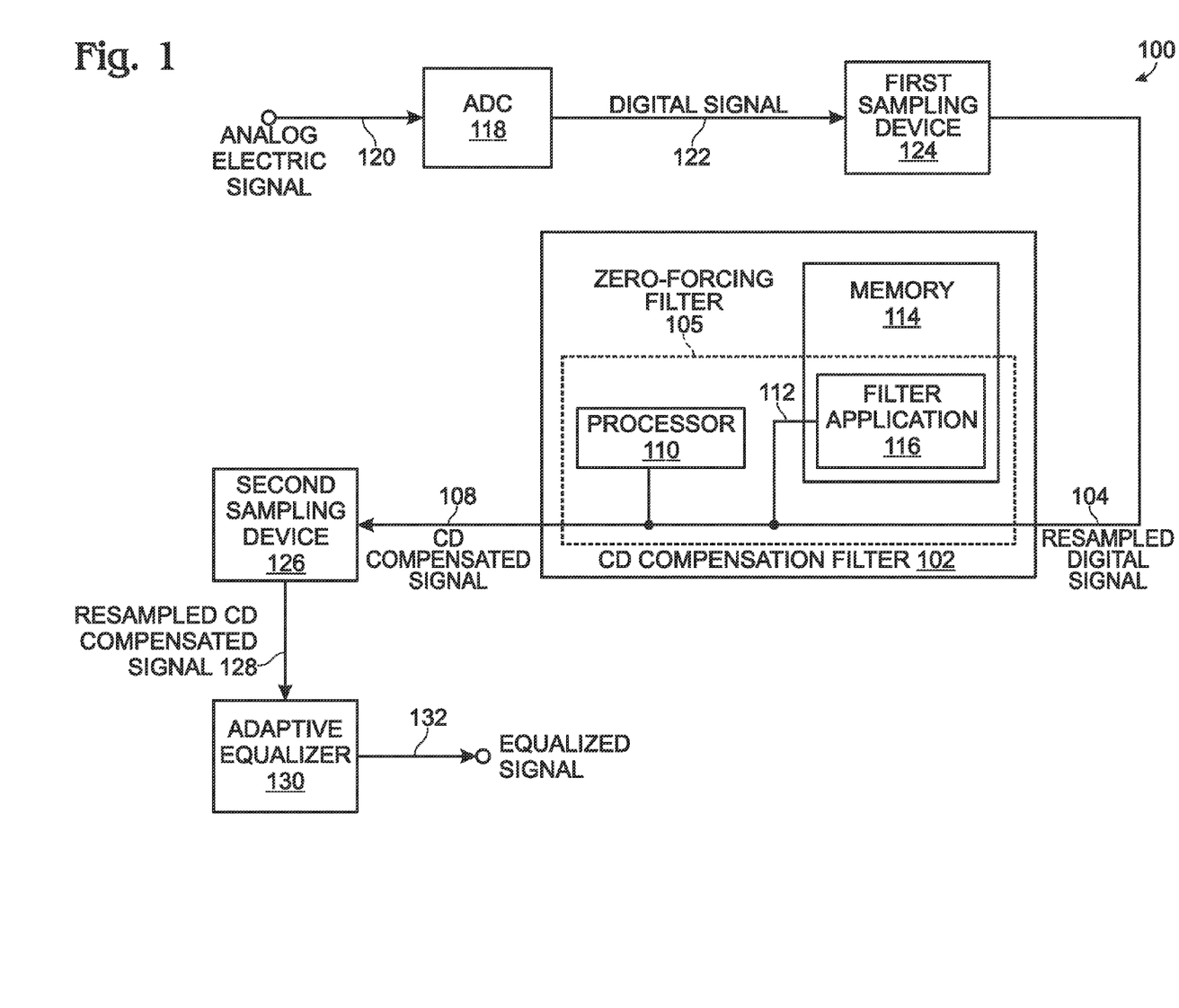
FIG. 1 is a schematic block diagram of a chromatic dispersion (CD) compensation system.

FIG. 1 is a schematic block diagram of a chromatic dispersion (CD) compensation system. The system 100 comprises a CD compensation filter 102, which has an input on line 104 to accept a resampled digital signal. The CD compensation filter 102 is made from a zero-forcing filter 105 with a number of taps (n−x), truncated from a zero-forcing filter calculated with the number of taps (n) required to nullify a chromatic dispersion frequency response of an optical channel, where x is an integer greater than 0. The CD compensation filter 102 has an output on line 108 to supply a CD compensated signal. In one aspect, the (n−x) number of CD compensation filter taps is chosen using a modeling criteria such as minimum mean-square error (MMSE) or effective channel delay spread.

As used in this application, the terms "component," "module," "system," and the like may be intended to refer to an automated computing system entity, such as hardware, firmware, a combination of hardware and software, software, software stored on a computer-readable medium, or software in execution. For example, a system may be, but is not limited to being, a process running on a processor, a processor, an object, an executable, a thread of execution, a program, and/or a computer. By way of illustration, both an application running on a computing device and the computing device can be a system. One or more systems can reside within a process and/or thread of execution and a system may be localized on one computer and/or distributed between two or more computers. In addition, these components can execute from various computer readable media having various data structures stored thereon. The components may communicate by way of local and/or remote processes.

The CD compensation filter may employ a computer system with a bus or other communication mechanism for communicating information, and a processor 110 (e.g., a processor customized to perform only filtering calculations) coupled to the bus for processing information. The CD compensation filter may also include a memory 114, such as a random access memory (RAM) or other dynamic storage device, coupled to the bus 112 for storing information and instructions to be executed by a processor. These memories may also be referred to as a computer-readable medium. The execution of the sequences of instructions contained in a computer-readable medium may cause a processor to perform some of the steps associated with compensation for CD in an optical communications channel. Alternately, these functions, or some of these functions may be performed in hardware. The practical implementation of such a computer system would be well known to one with skill in the art.

As used herein, the term "computer-readable medium" refers to any medium that participates in providing instructions to a processor for execution. Such a medium may take many forms, including but not limited to, non-volatile media, volatile media, and transmission media. Non-volatile media includes, for example, optical or magnetic disks. Volatile media includes dynamic memory. Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

The means of controlling the CD compensation filter processor 110 may be a filter software application 116 stored in the memory 114. The filter application 116 may be enabled as a software application of sequential instructions stored in the memory 114 and executed by the processor 110. As such, the taps may be processor executed instructions. Alternately but not shown in this figure, the CD compensation filter may be completely or partially enabled in hardware as a state machine type logic module (e.g., a field programmable gate array (FPGA)) or dedicated hardware application-specific integrated circuit (ASIC). As such, the taps may be implemented in hardware.

In one aspect, the system 100 further comprises an analog-to-digital converter (ADC) 118 having an input on line 120 to accept an analog electrical signal and an output on line 122 to supply a digital signal at an initial sampling frequency $F_1$. A first sampling device 124 has an input on line 122 to accept the digital signal, and an output on line 104 to supply the resampled digital signal at a sampling frequency $F_2$, lower in frequency than $F_1$. A second sampling device 126 has an input on line 108 to accept the CD compensated signal and an output on line 128 to supply a resampled CD compensated signal at a sampling frequency $F_3$, greater than or equal to the $F_2$ sampling frequency. An adaptive equalizer 130 has an input on line 128 to accept the resampled CD compensated signal and an output on line 132 to supply an equalized signal.

Figure 2:
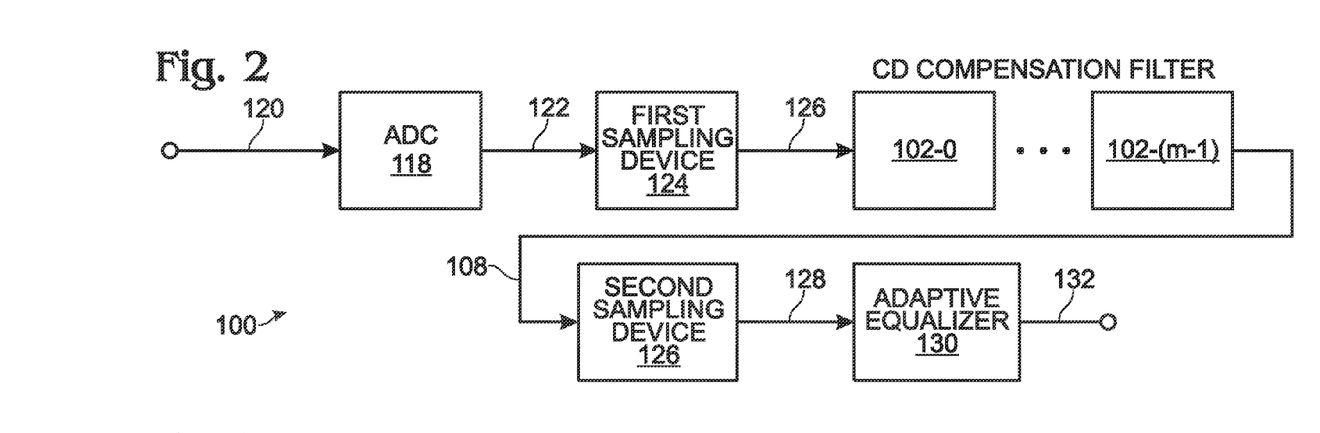
FIG. 2 is a schematic block diagram depicting a variation of the CD compensation system of FIG. 1.

FIG. 2 is a schematic block diagram depicting a variation of the CD compensation system of FIG. 1. In this aspect, the n number of taps for the zero-forcing filter is calculated by partitioning the chromatic dispersion frequency response of the optical channel into a plurality (m) of constituent chromatic dispersion responses. A zero-forcing filter is calculated for each of the plurality of constituent chromatic dispersion responses. Then, the CD compensation filter is a cascaded series of CD compensation filters 102-0 through 102-($m$−1), each associated with a corresponding zero-forcing filter having a truncated number of taps. The variable m is an integer not limited to any particular value. Alternatively stated, the total number of taps for the m cascaded filters is (n−x).

Figure 3:
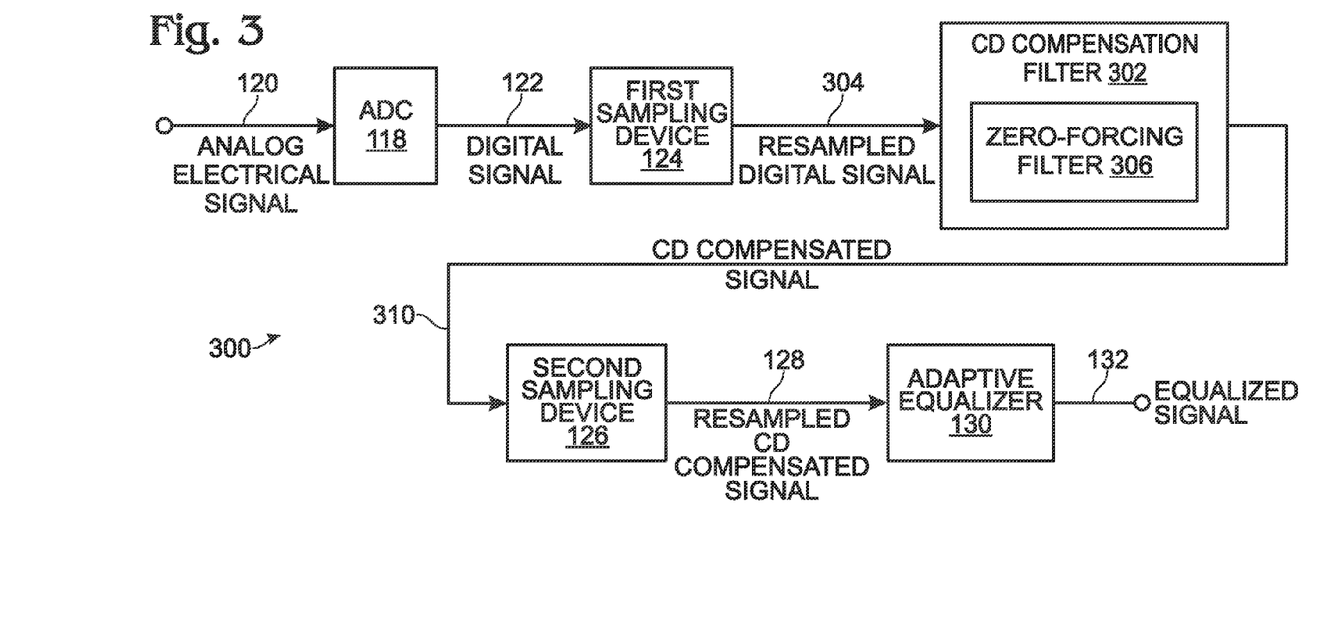
FIG. 3 is a schematic block diagram depicting a CD compensation system using quantized tap values.

FIG. 3 is a schematic block diagram depicting a CD compensation system using quantized tap values. The system 300 comprises a CD compensation filter 302 with an input on line 304 to accept a resampled digital signal. A zero-forcing filter 306 is calculated with a number of taps (n) required to nullify the chromatic dispersion frequency response of an optical channel, where tap values are represented by a finite quantization set. The CD compensation filter 306 has an output on line 310 to supply a CD compensated signal.

Although not explicitly shown in this figure, the CD compensation filter may be enabled in hardware, or using a processor and filtering software application stored in memory, as depicted in FIG. 1. In one aspect, the quantized set of tap values is given by:

$$M^{(1 i \cdot 2 \cdot \pi / p)};$$

where i is a value between 1 and p; and,
where M is a magnitude.

The quantization set of tap values may be chosen to meet a MMSE or effective channel delay spread modeling criteria.

In another aspect, the system 300 further comprises an ADC 118 having an input on line 120 to accept an analog electrical signal and an output on line 122 to supply a digital signal at an initial sampling frequency $F_1$. A first sampling device 124 has an input on line 122 to accept the digital signal, and an output on line 304 to supply the resampled digital signal at a sampling frequency $F_2$, which may be lower than $F_1$. A second sampling device 126 has an input on line 310 to accept the CD compensated signal and an output on line 128 to supply a resampled CD compensated signal at a sampling frequency $F_3$, greater than or equal to the $F_2$ sampling frequency. An adaptive equalizer 130 has an input on line 128 to accept the resampled CD compensated signal and an output on line 132 to supply an equalized signal.

Figure 4:
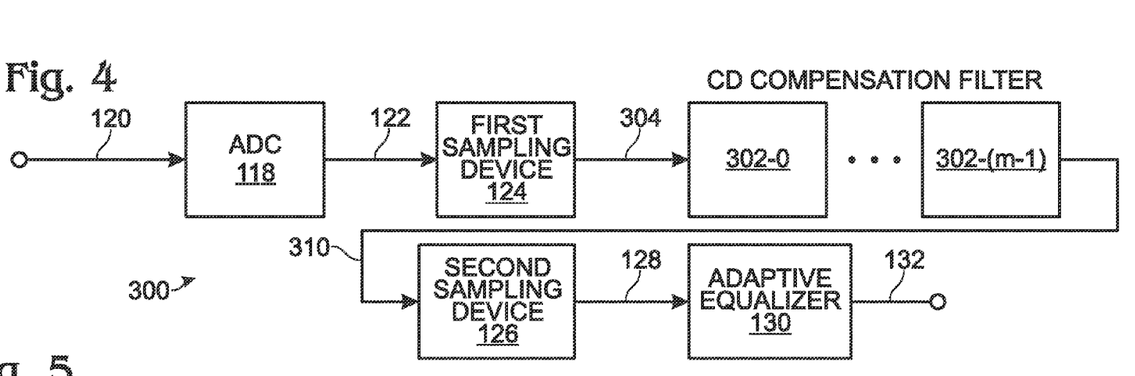
FIG. 4 is a schematic block diagram depicting a variation of the CD compensation system of FIG. 3.

FIG. 4 is a schematic block diagram depicting a variation of the CD compensation system of FIG. 3. In this aspect, the n number of taps for the zero-forcing filter is calculated by partitioning the chromatic dispersion frequency response of the optical channel into a plurality of (m) constituent chromatic dispersion responses. The variable m is an integer not limited to any particular value. A zero-forcing filter is calculated corresponding to each of the plurality of constituent chromatic dispersion responses. Then, the CD compensation filter is a cascaded series of CD compensation filters 302-0 through 302-($m$−1), each associated with a corresponding zero-forcing filter using a finite quantization set of tap values.

Figure 5:
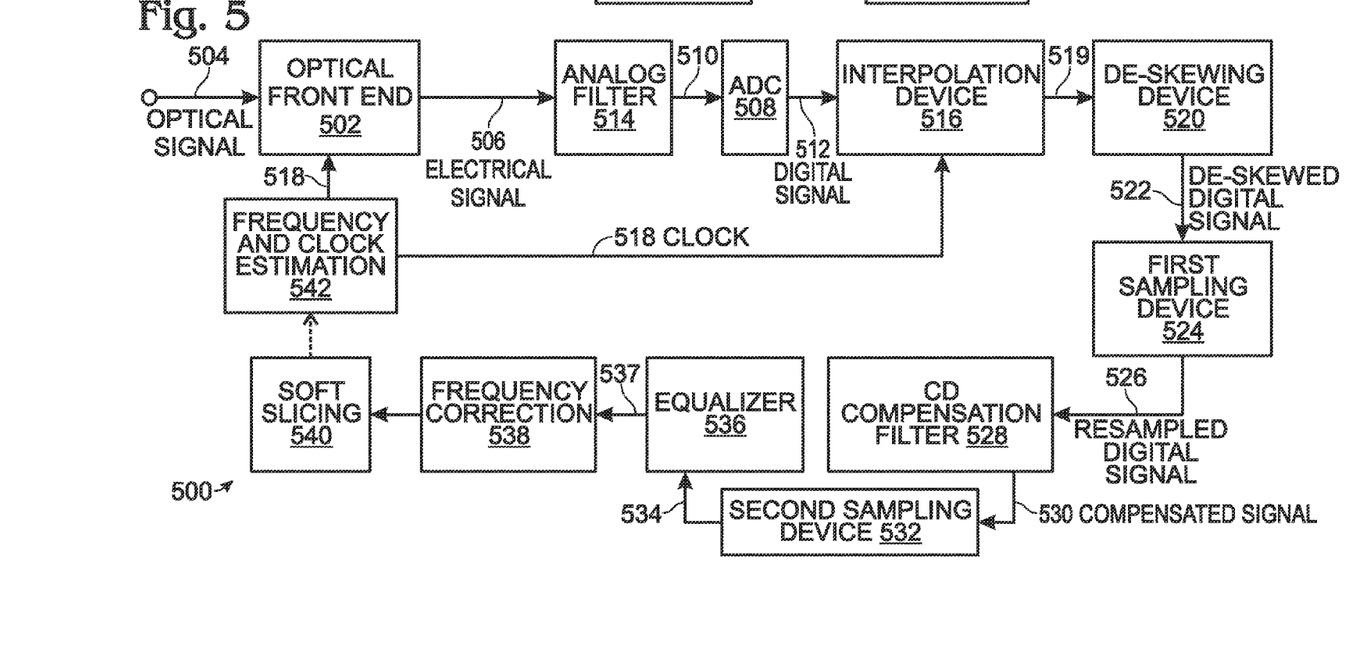
FIG. 5 is a schematic block diagram of an optical receiver with a CD compensation system.

FIG. 5 is a schematic block diagram of an optical receiver with a CD compensation system. The receiver may, for example, be a dual-polarity (DP)-quadrature phase-shift keying (QPSK) capable of 100 gigabit per second (Gbps) communication over an optical fiber span. The receiver 500 comprises an optical front end 502 having a network interface on line 504 to receive an optical signal. The optical front end 502 converts the optical signal to an analog electrical signal supplied at an output on line 506. A typical optical front end may employ photodiodes to convert optical signals to electrical signals, followed by a transimpedance amplifier (TIA). An ADC 508 has an input on line 510 to accept the analog electrical signal and an output on line 512 to supply a digital signal at an initial sampling frequency $F_1$. Typically, as shown, an analog filter 514 may be interposed between the ADC 508 and optical front end 502 to remove higher frequency components of the electrical signal, reducing the required sampling rate.

An interpolation device 516 has an input on line 512 to accept the digital signal and an input on line 518 to accept a clock signal. The interpolation device 516 corrects for clock and phase sampling errors in the digital signal, and it supplies a phase corrected digital signal at an output on line 519. A number of interpolation devices are known in the art that would be capable of enabling the system 500. A de-skewing device 520 has an input to accept the phase corrected digital signal on line 519. The de-skewing device 520 corrects for I/Q modulation balance and supplies a de-skewed digital signal at an output on line 522. Again, a number of de-skewing devices are known in the art that would be capable of enabling the system 500.

A first sampling device 524 has an input on line 522 to accept the de-skewed digital input signal, and an output on line 526 to supply a resampled digital input signal at a sampling frequency $F_2$. A CD compensation filter 528 has an input on line 526 to accept the resampled digital signal. The CD compensation filter includes a zero-forcing filter (see FIGS. 1-4) calculated with a number of taps (n) required to nullify a chromatic dispersion frequency response of an optical channel. The zero-forcing filter mechanism uses tap values represented by a finite quantization set, as described above in FIGS. 3 and 4, or it uses a truncated number of taps (n−x), where x is an integer greater than 0, as described above in FIGS. 1 and 2. The CD compensation filter 528 has an output on line 530 to supply a CD compensated signal.

A second sampling device 532 has an input on line 530 to accept the CD compensated signal and an output on line 534 to supply a resampled CD compensated signal at a sampling frequency $F_3$. An adaptive equalizer 536 has an input on line 534 to accept the resampled CD compensated signal and an output on line 537 to supply an equalized signal. The receiver 500 may additionally include a frequency correction device 538, soft slicer 540, and a device 542 to estimate frequency and supply clock signals. Components 538, 540, and 542 are well known in the art. In one aspect, all the components following the analog filter 514 may be implemented in a single chip or physical device.

In one aspect, the first sampling device 524 supplies the resampled digital signal at the sampling frequency $F_2$, lower in frequency than $F_1$. Likewise, the second sampling device 532 may supply the resampled CD compensated signal at the sampling frequency $F_3$, greater than or equal to the $F_2$ sampling frequency.

Functional Description

Figure 7:
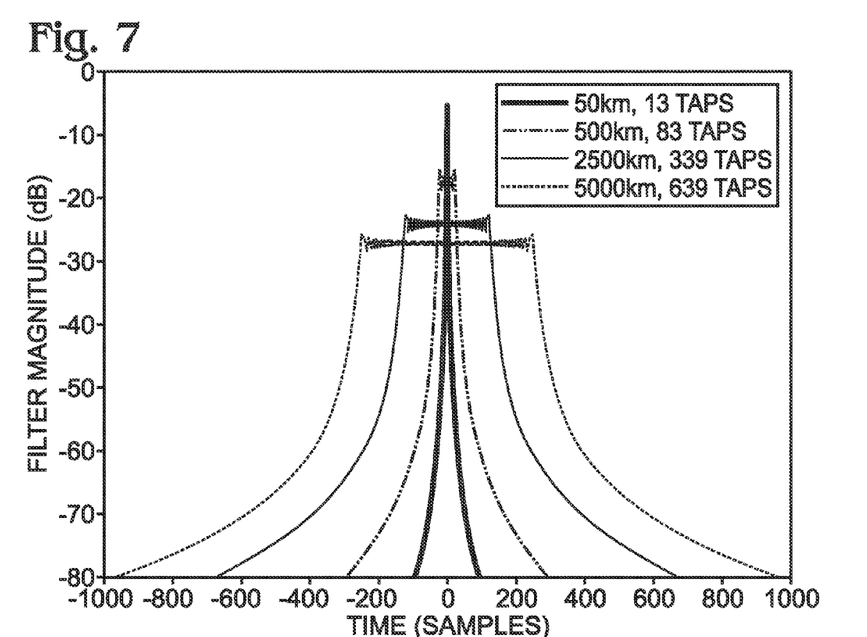
FIG. 7 is a graph depicting the filter length (number of taps) required for to nullify CD effects at a variety of fiber distances.

FIG. 7 is a graph depicting the filter length (number of taps) required for to nullify CD effects at a variety of fiber distances. The required filter length increases from a filter length of 13 taps at 50 km to 639 taps at 5000 km, assuming a roughly linear sampling frequency. In practical channels, a large number of taps necessitates high power consumption. To reduce power consumption, the length of filter can be reduced and sampling rate used during CD compensation can be reduced.

Figure 8A:
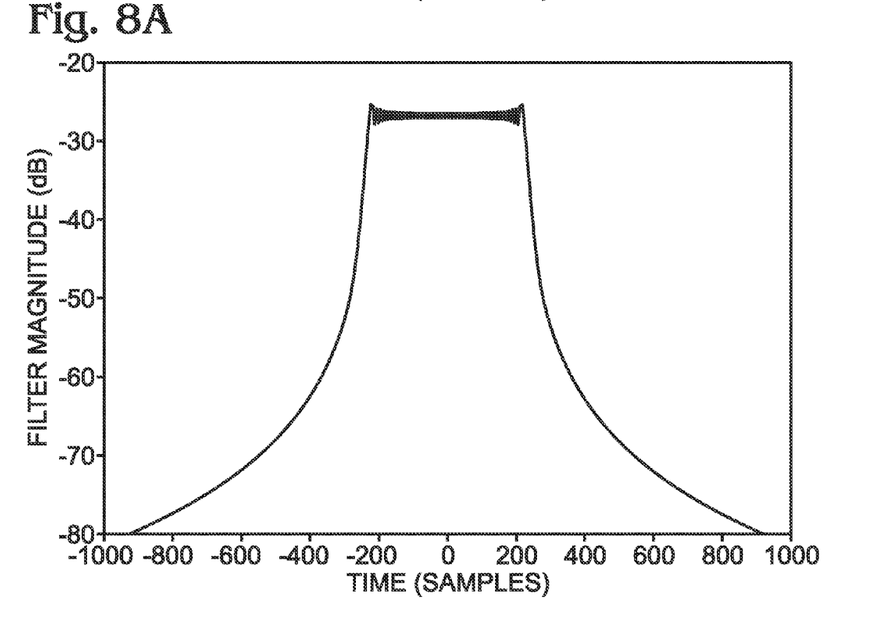
FIGS. 8A and 8B are graphs depicting CD compensation using a reduced filter length.
Figure 8B:
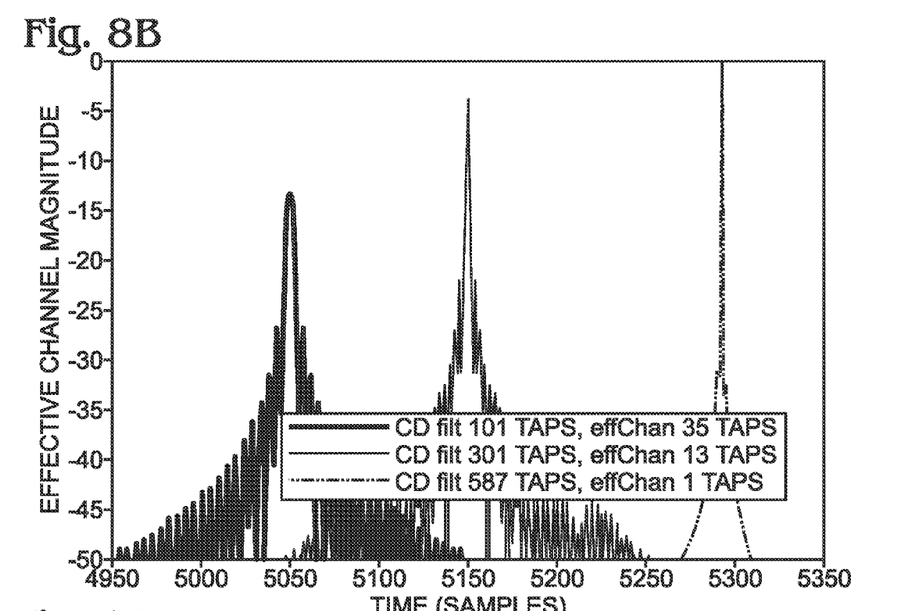

FIGS. 8A and 8B are graphs depicting CD compensation using a reduced filter length. The equation below is one example of a zero-forcing filter to determine the desired filter given the total dispersion D. The term zero-forcing is well known in the art and denotes the fact that this filter aims to force the inter-symbol interference to zero by completely compensating the estimated chromatic dispersion. More precisely, the zero forcing filter is the exact reciprocal of the estimated CD filter response $H_{CD}(w)$ given in the Background Section above.

$$G(z, w) = \exp\left(+\frac{D\lambda^2}{4\pi c}Lw^2\right)$$

Note that the reference frequency $w_s$ is assumed to be zero, since the optical front end downconverts the desired signal to a zero center frequency.

As shown in FIG. 8A, the fiber length is 2000 km, with 16.75 picosecond (ps)/nanometer (nm)/km dispersion, assuming no polarization mode dispersion (PMD) and non-linearity. The filter time-domain response is roughly flat up to some $L_{max}$ samples, and then 0 afterwards, after some roll-off time span.

In order to reduce the filter power consumption, it is desirable to truncate the filter to use a shorter filter $L<L_{max}$. For example, the truncation method may be to use central L samples. Other more sophisticated truncation algorithms may be based on MMSE or other target criteria. As shown in FIG. 8B, a lower L results in an effective channel with some spread (i.e. a channel with non-zero intersymbol interference), which can be cleaned up by PMD filter. As L increases, the effect of truncating the zero-forcing filter is reduced, and the effective channel length is reduced. As shown in detail below, the BER degrades graceful as L decreases.

Figure 9:
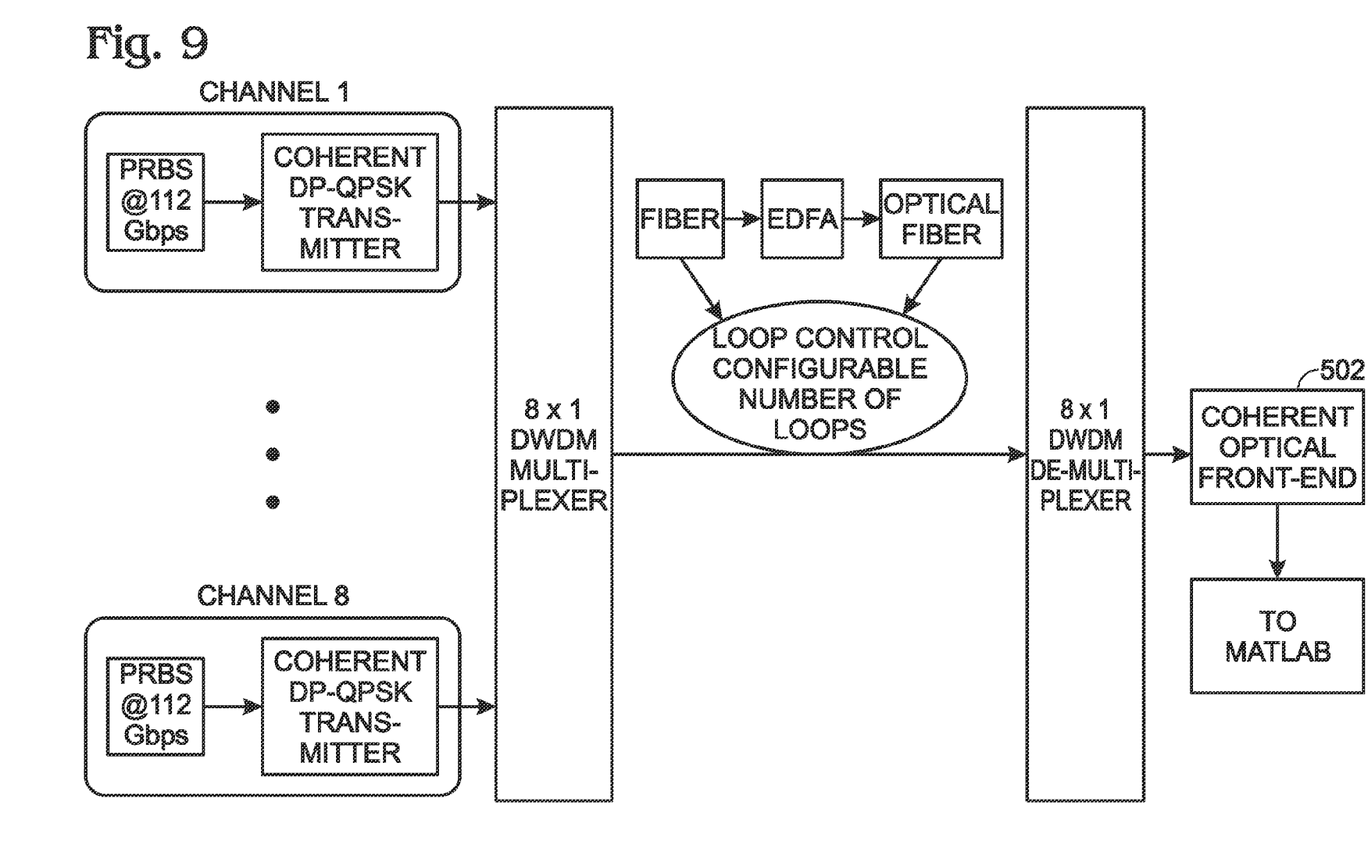
FIG. 9 is a schematic block diagram depicting a simulation setup.

FIG. 9 is a schematic block diagram depicting a simulation setup. An OptiSystem™ system simulator, manufactured by Optiwave Inc., was used to model the above-described optical system. Output data at the output of the coherent optical front-end 502 was stored in Matlab™ at 6× oversampling for further processing. The system used 8 channels, with DP-QPSK transmitters supplying a pseudorandom binary sequence (PRBS) at 112 gigabits per second (Gbps). The channels were spaced 50 gigahertz (GHz) apart from 193.25 terahertz (THz) to 193.6 THz. The 8 channels were presented to a dense wavelength division multiplexer (DWDM). The fiber used was 0.2 dB/km attenuation 16.75 ps/nm km. After presentation to a 8×1 DWDM demultiplexer (spaced 50 GHz apart from 193.25 THz to 193.6 THz), the optical signals were fed to the coherent optical front end 502 (see FIG. 5).

Figure 10:
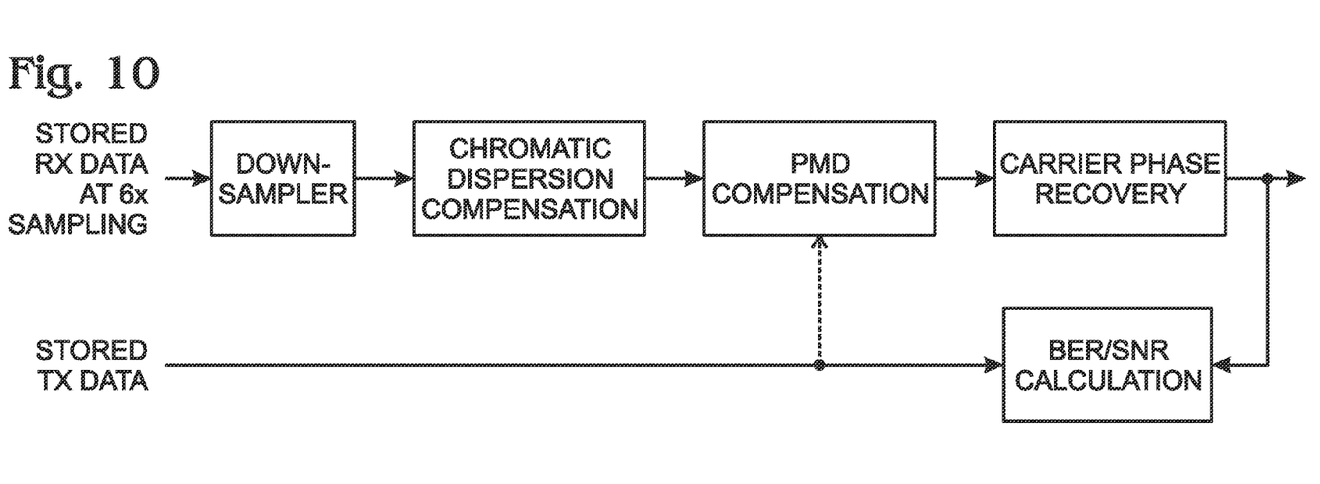
FIG. 10 is a schematic diagram depicting the Matlab algorithm setup.

FIG. 10 is a schematic diagram depicting the Matlab algorithm setup. A downsampler was used to try various output ratios to estimate effect on performance. Rates of 1×, 1.5×, and 2× the Nyquist rate were used. CD compensation was implemented as a finite impulse response (FIR) filter. The filter was obtained by truncating the theoretical filter with the given number of taps required to nullify CD. The filter was parameterized by filter length (the number of non-zero taps) and total dispersion estimate obtained by multiplying the known fiber length by 16.75. A PMD compensation adaptive filter was parameterized by length, and both training-based and constant modulus algorithm (CMA)-based methods, using straightforward update equations, except for 1.5× sampling (as explained below).

For carrier phase recovery a second order Costas loop was used. The carrier frequency error was added to check BER. BER was calculated by comparing with a delayed version of the input bits. Signal-to-noise (SNR) was calculated by recreating the signal based on input, with the remainder being noise.

Figure 11:
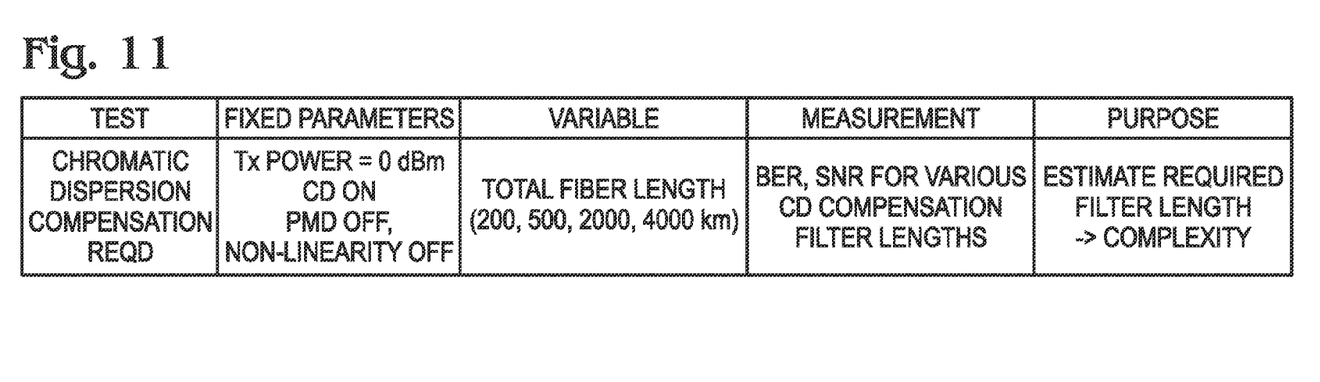
FIG. 11 is a table listing the parameters of a first CD compensation experiment.

FIG. 11 is a table listing the parameters of a first CD compensation experiment. For various fiber lengths, the Optiwave simulation system (FIG. 9) was run to capture data. Matlab was run at various sampling frequencies and CD filter lengths, and BER was measured, as presented in FIGS. 12 and 13.

Figure 12:
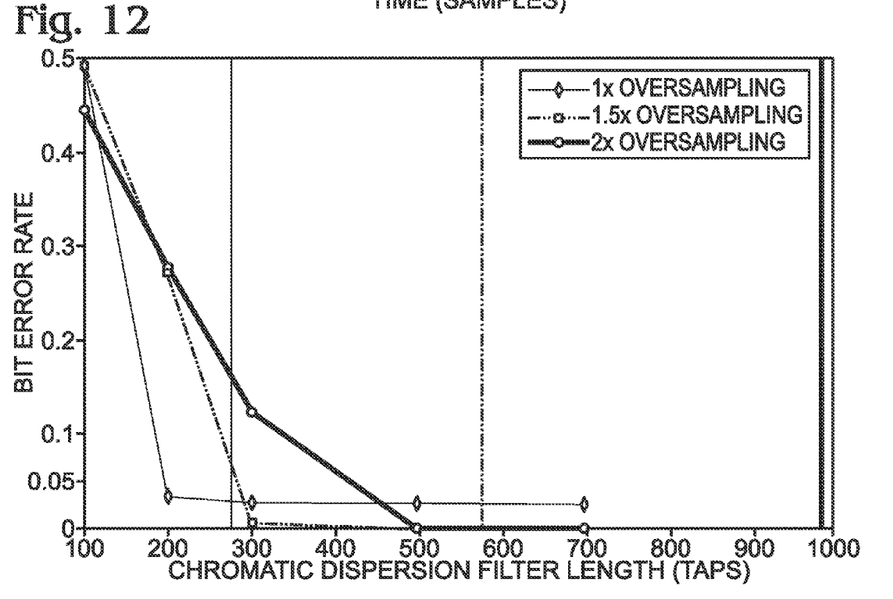
FIG. 12 is a graph plotting BER against CD filter length (number of taps).

FIG. 12 is a graph plotting BER against CD filter length (number of taps). The vertical lines show the theoretical filter depth required to completely eliminate intersymbol interference (ISI). The graph shows that good performance can be obtained even at smaller filter lengths. The 1× sampling shows the error floor, mainly due to noise aliasing in-band (only second order Gaussian filter modeled). 1.5× sampling offers adequate performance with 300 taps @ 2000 km. 2× sampling requires more taps than either 1× or 1.5×.

Figure 13:
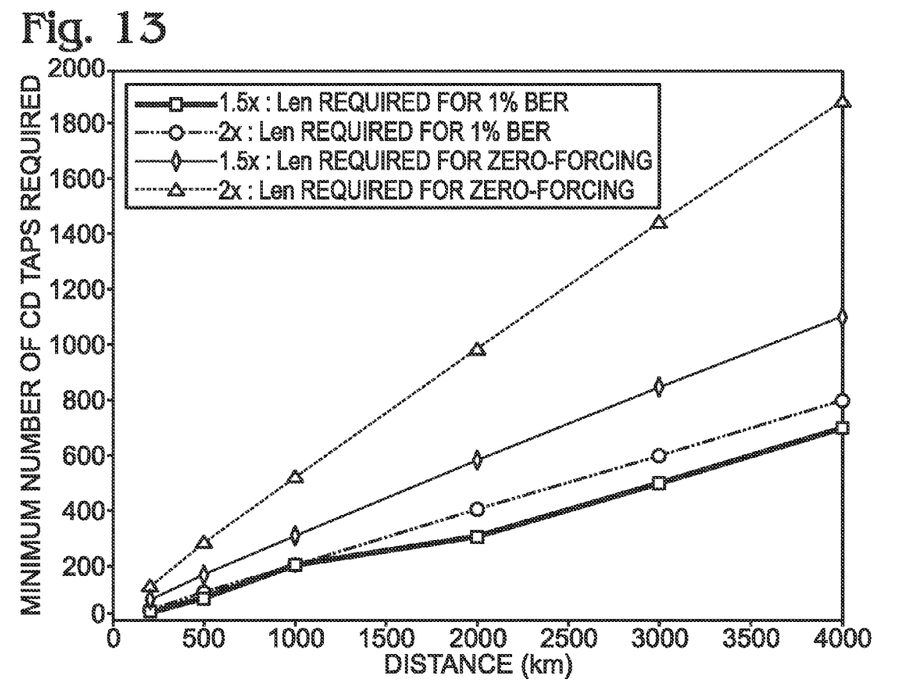
FIG. 13 is a graph depicting the minimum CD length required to achieve 1% BER for various sampling frequencies.

FIG. 13 is a graph depicting the minimum CD length required to achieve 1% BER for various sampling frequencies. This BER rate is below the error-rate target at the forward error correction decoder input for long-haul systems. The length (Len) required for 1% BER is much smaller than length required for zero-forcing (0% BER). At high lengths, 2× sampling requires ~100 taps more than 1.5× sampling. To achieve 1% BER, nearly 800 taps are required at 4000 km with a 2× sampling rate.

In summary, CD compensation may be simplified by using a shorter length filter, which is essentially channel shortening instead of full equalization. At 1.5× oversampling of 28 Gbaud signals, chromatic dispersion can be compensated by 30-400 tap filters for distances from 200 km-4000 km. Shorter filter coefficients can be determined by:
 truncating a known filter;
 using MMSE or other target function;
 minimizing delay spread of effective channel; or
 minimizing energy in the effective channel outside pre-determined support window. In addition, CD compensation can be run at lower rate, then upsampled before PMD compensation.

Figure 14A:
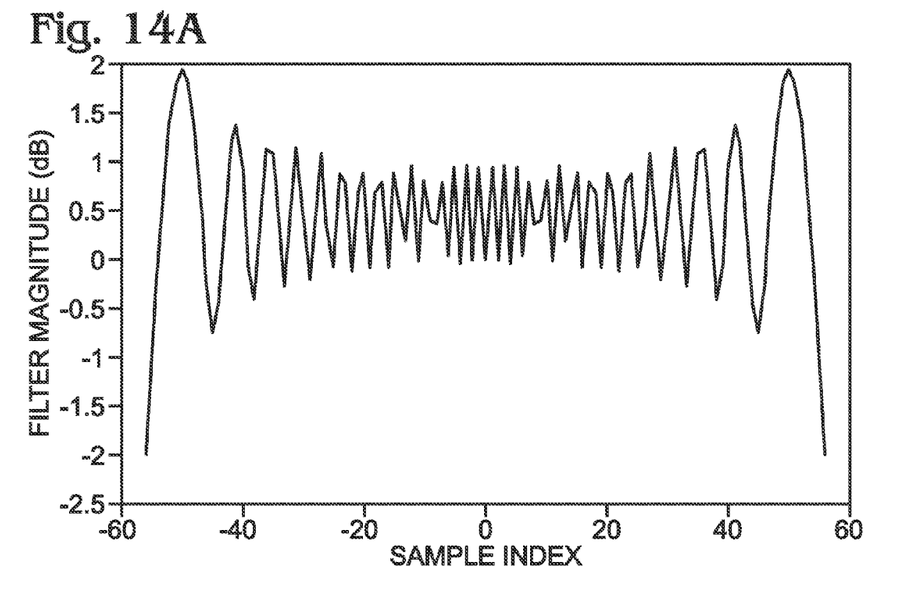
FIGS. 14A and 14B are graphs depicting, respectively, the magnitude and angle of a CD compensation filter at 8375 ps/nm.
Figure 14B:
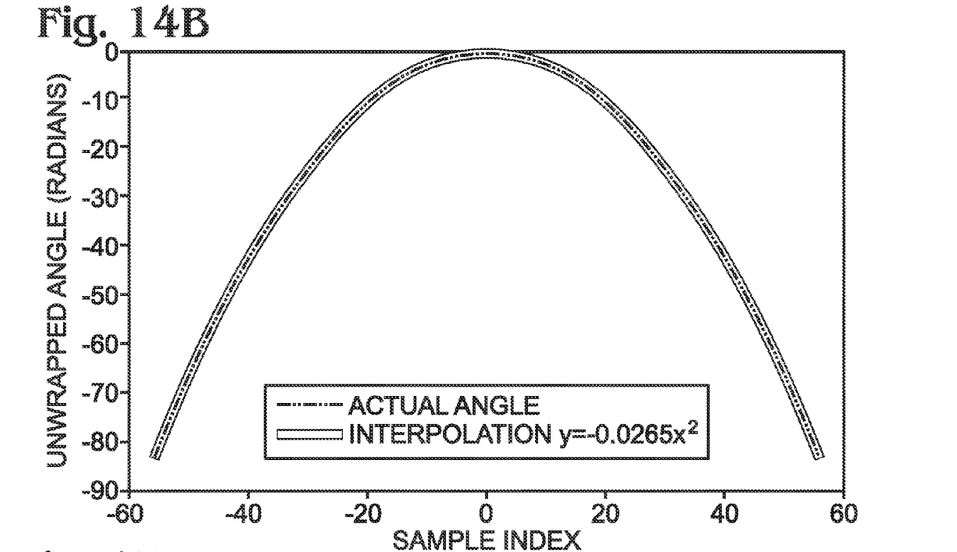

FIGS. 14A and 14B are graphs depicting, respectively, the magnitude and angle of a CD compensation filter at 8375 ps/nm. Additional methods of simplifying CD compensate complement the truncation method. CD compensation can also be simplified using the concept of cascading.

$$G(z, w) = \exp\left(+\frac{D\lambda^2}{4\pi c}Lw^2\right)$$

Considering only the second order term, the CD compensation filter (above) can be broken up into a cascade of compensation filters for smaller lengths:

$G(D1+D2,w)=G(D1,w)\cdot G(D2,w)$.

Cascading allows for the reuse of a smaller filter, designed for lower channel dispersion, in a receiver that has to operate under higher dispersion. Cascading also allows the design of a scalable compensation scheme, which supports multiple fiber lengths, simply by varying the number of component filters in the cascade.

Further, each of the smaller filters in a cascade can be further simplified as follows. In the time domain, the CD compensation filter is found to be roughly flat in magnitude within its support. For example, the filter may consist of a set of contiguous taps of roughly equal magnitude, with all the other taps being nearly zero. Secondly, the phase of the significant taps may be a quadratic function of the sample index (FIG. 14B).

Thus, approximating the magnitude of the significant taps to be constant, each filter in the cascade can be implemented in the time-domain with coefficients of the same magnitude, and a quadratric, symmetric phase. In addition, for simplicity the phase of the non-zero taps can be quantized to, for example, 8 or 16 levels. With quantization addition, scaling, and summing operations can be implementation, instead of the more processor intensive multiply and sum. Only 8-16 discrete values of coefficients are needed, each one with a unit magnitude. All inputs with the same coefficient can be added. The sum can be scaled by the corresponding coefficient, and the result added up. By greatly reducing multiplication operations, power consumption is reduced.

Figure 15:
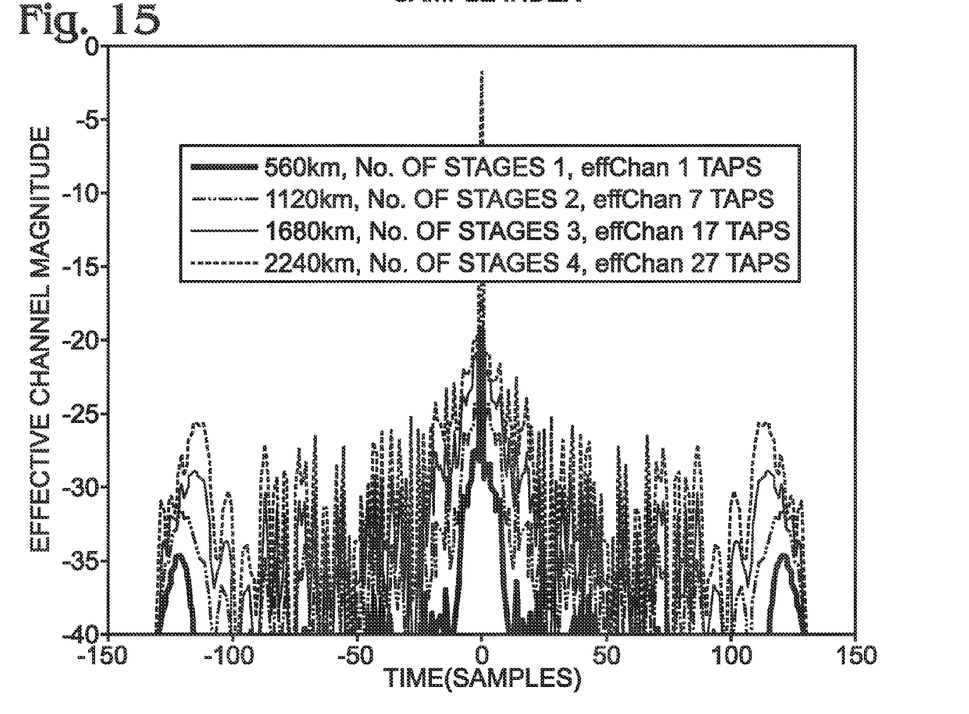
FIG. 15 is a graph depicting the effect of rounding off the tap magnitude to a constant value and quantizing the phase to 16 values.

FIG. 15 is a graph depicting the effect of rounding off the tap magnitude to a constant value and quantizing the phase to 16 values. The CD compensation filter for a total channel length of 2240 km is implemented as cascade of four 560-km length filters, each approximated as described above. At the end of the four filters, the effective channel only has a length of 27 taps, which can be compensated by the adaptive PMD compensation filter.

Therefore, CD compensation can be implemented for large distances as a cascade of smaller distances. Different stages may be designed for different dispersion targets. Further, individual stages may be bypassed or powered down to save total power. Individual stages can be efficiently implemented by using time domain magnitude and phase properties of the filter coefficients. Magnitude and phase quantization permit efficient sum-scale-sum implementation instead of multiply-sum implementation.

Figure 16:
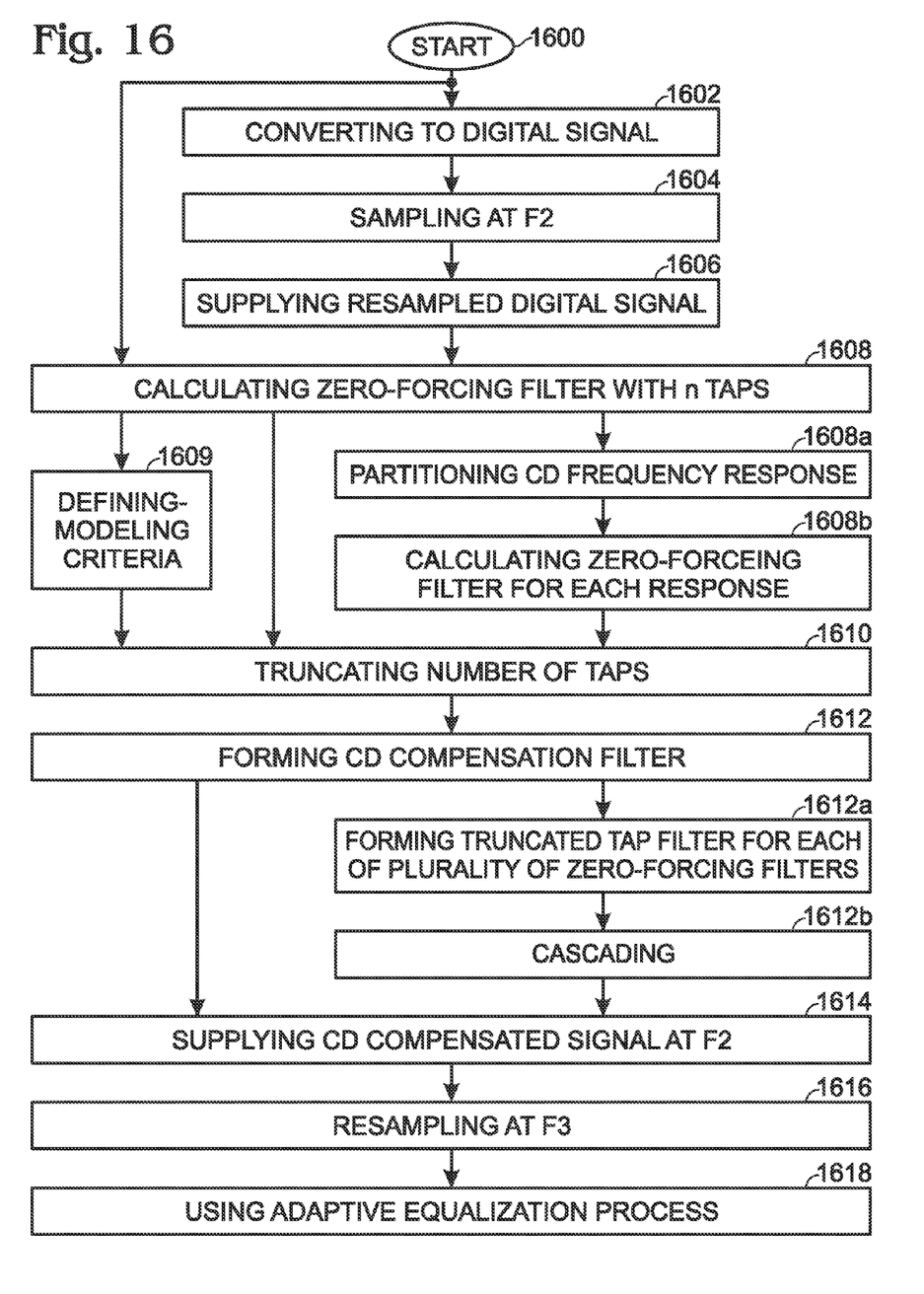
FIG. 16 is a flowchart illustrating a method for performing CD compensation.

FIG. 16 is a flowchart illustrating a method for performing CD compensation. Although the method is depicted as a sequence of numbered steps for clarity, the numbering does not necessarily dictate the order of the steps. It should be understood that some of these steps may be skipped, performed in parallel, or performed without the requirement of maintaining a strict order of sequence. Generally however, the method follows the numeric order of the depicted steps. The method starts at Step 1600.

Step 1602 converts an analog electrical signal to a digital signal at an initial sampling frequency $F_1$. Step 1604 resamples the digital signal at a sampling frequency $F_2$. In one aspect, $F_2$ is lower in frequency than $F_1$. Step 1606 supplies the resampled digital signal to the CD compensation filter. Step 1608 calculates a zero-forcing filter with a number of taps (n) required to nullify a chromatic dispersion frequency response of an optical channel. Step 1610 truncates the number of taps in the zero-forcing filter to a number equal to (n−x), where x is an integer greater than 0. Step 1612 uses the truncated zero-forcing filter to form a CD compensation filter.

In one aspect, in Step 1614 the CD compensation filter supplies a CD compensated signal at the $F_2$ sampling frequency. Step 1616 resamples the CD compensated input signal at a sampling frequency $F_3$, greater than or equal to the $F_2$ sampling frequency. Step 1618 uses an adaptive equalizer to process the resampled CD compensated signal.

In another aspect, Step 1609 defines a modeling criteria based upon MMSE or effective channel delay spread, to name a few examples, Then truncating the number of taps in the zero-forcing filter in Step 1610 includes selecting (n−x) taps the meet the defined modeling criteria.

In a different aspect, calculating the zero-forcing filter in Step 1608 includes substeps. Step 1608a partitions the chromatic dispersion frequency response of the optical channel into a plurality of constituent chromatic dispersion responses. Step 1608b calculates a zero-forcing filter corresponding to each of the plurality of constituent chromatic dispersion responses. Truncating the number of taps in the zero-forcing filter in Step 1610 includes truncating the number of taps in each of the plurality of zero-forcing filters. Then, forming the CD compensation filter in Step 1612 includes substeps. Step 1612a forms a CD compensation filter for each of the plurality of truncated tap zero-forcing filters. Step 1612b cascades the plurality of CD compensation filters.

Figure 6:
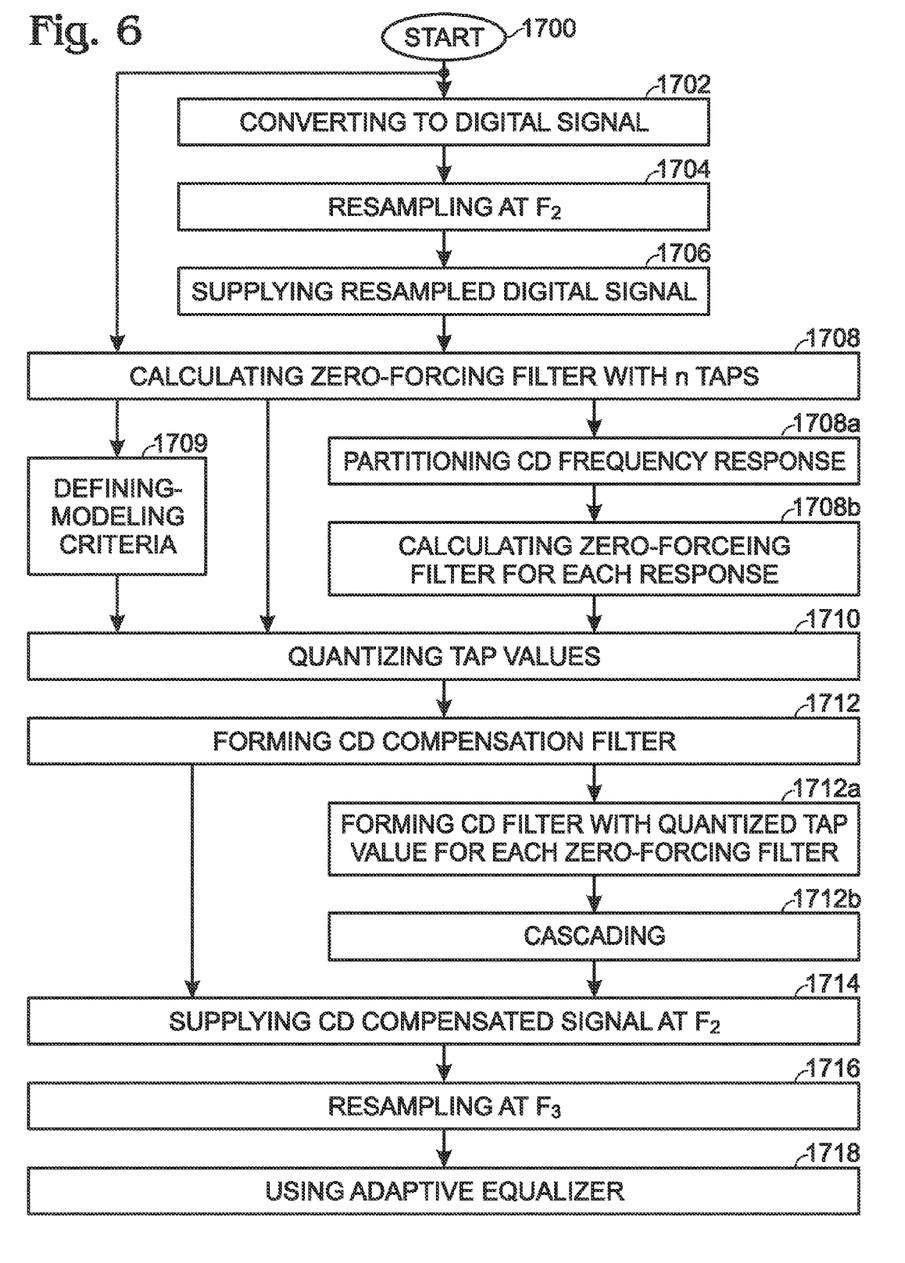
FIG. 6 is a flowchart illustrating a variation in the method for performing CD compensation.

FIG. 6 is a flowchart illustrating a variation in the method for performing CD compensation. The method starts at Step 1700. Step 1702 converts an analog electrical signal to a digital signal at an initial sampling frequency $F_1$. Step 1704 resamples the digital signal to a sampling frequency $F_2$. In one aspect, $F_2$ is lower in frequency than $F_1$. Step 1706 supplies the resampled digital signal to the CD compensation filter. Step 1708 calculates a zero-forcing filter with a number of taps (n) required to nullify a chromatic dispersion frequency response of an optical channel. Step 1710 quantizes the tap values of the zero-forcing filter to a finite quantization set. Step 1712 uses the finite quantization set of tap values to form a CD compensation filter. For example, the quantized set may be given by the following equation:

$$M^{(1 \cdot i \cdot 2 \cdot \pi / p)};$$

where i is a value between 1 and p; and, where M is a magnitude. In some aspect, the magnitude need not necessarily by a unit value.

In one aspect, Step 1709 defines a modeling criteria such as MMSE or effective channel delay spread, and quantizing the tap values in Step 1710 includes using a tap values the meet the defined modeling criteria.

In another aspect, in Step 1714 the CD compensation filter supplies a CD compensated signal at the $F_2$ sampling frequency. Step 1716 resamples the CD compensated signal at a sampling frequency $F_3$, greater than or equal to the $F_2$ sampling frequency. Step 1718 uses an adaptive equalizer to process the resampled CD compensated signal.

In a different aspect, calculating the zero-forcing filter in Step 1708 includes substeps. Step 1708a partitions the chromatic dispersion frequency response of the optical channel into a plurality of constituent chromatic dispersion responses. Step 1708b calculates a zero-forcing filter corresponding to each of the plurality of constituent chromatic dispersion responses. Then, forming the CD compensation filter in Step 1712 includes the following substeps. Step 1712a forms a CD compensation filter using the quantized set of tap values for each of the plurality of zero-forcing filters. Step 1712b cascades the plurality of CD compensation filters.

A system and method have been provided for CD compensation. Examples of zero-forcing functions, truncated tap numbers, quantization values, and sampling rates have been presented to illustrate the invention. However, the invention is not limited to merely these examples. Other variations and embodiments of the invention will occur to those skilled in the art.

We claim:

1. An optical receiver with a chromatic dispersion (CD) compensation system, the receiver comprising:
   an optical front end having a network interface to receive an optical signal, the optical front end converting the optical signal to an analog electrical signal supplied at an output;
   an analog-to-digital converter (ADC) having an input to accept the analog electrical signal and an output to supply a digital signal at an initial sampling frequency $F_1$;
   an interpolation device having an input to accept the digital signal and an input to accept a clock signal, the interpolation device correcting for clock and phase sampling errors in the digital signal and supplying a phase corrected digital signal at an output;

a de-skewing device having an input to accept the phase corrected digital signal, the de-skewing device correcting for I/Q modulation balance and supplying a de-skewed digital signal at an output;

a first sampling device having an input to accept the de-skewed digital input signal, and an output to supply a resampled digital input signal at a sampling frequency $F_2$;

a CD compensation filter having an input to accept the resampled digital signal, a zero-forcing filter calculated with a number of taps (n) required to nullify a chromatic dispersion frequency response of an optical channel, the zero-forcing filter using a filter mechanism selected from a group consisting of using tap values represented by a finite quantization set and using a truncated number of taps (n−x), where x is an integer greater than 0, the CD compensation filter having an output to supply a CD compensated signal;

a second sampling device having an input to accept the CD compensated signal and an output to supply a resampled CD compensated signal at a sampling frequency $F_3$; and, an adaptive equalizer having an input to accept the resampled CD compensated signal and an output to supply an equalized signal.

2. The receiver of claim 1 wherein the first sampling device supplies the resampled digital signal at the sampling frequency $F_2$, lower in frequency than $F_1$, and, wherein the second sampling device supplies the resampled CD compensated signal at the sampling frequency $F_3$, greater than or equal to the $F_2$ sampling frequency.

3. A method for performing chromatic dispersion (CD) compensation, comprising:

calculating a zero-forcing filter with a number of taps (n) required to nullify a chromatic dispersion frequency response of an optical channel;

truncating the number of taps in the zero-forcing filter to a number equal to (n−x), where x is an integer greater than 0; and using the truncated zero-forcing filter to form a CD compensation filter, wherein calculating the zero-forcing filter comprises:
partitioning the chromatic dispersion frequency response of the optical channel into a plurality of constituent chromatic dispersion responses;
calculating a zero-forcing filter corresponding to each of the plurality of constituent chromatic dispersion responses;

truncating the number of taps in the zero-forcing filter comprises truncating the number of taps in each of the plurality of zero-forcing filters; and forming the CD compensation filter comprises:
forming a CD compensation filter for each of the plurality of truncated tap zero-forcing filters; and
cascading the plurality of CD compensation filters.

4. The method of claim 3 further comprising:
converting an analog electrical signal to a digital signal at an initial sampling frequency $F_1$;
resampling the digital signal at a sampling frequency $F_2$, lower in frequency than $F_1$;
supplying the resampled digital signal to the CD compensation filter;
the CD compensation filter supplying a CD compensated signal at the $F_2$ sampling frequency;
resampling the CD compensated input signal at a sampling frequency $F_3$, greater than or equal to the $F_2$ sampling frequency; and using an adaptive equalizer to process the resampled CD compensated signal.

5. The method of claim 3 further comprising:
defining a modeling criterion comprising minimum mean-square error (MMSE) or effective channel delay spread; and
wherein truncating the number of taps in the zero-forcing filter comprises selecting (n−x) taps the meet the defined modeling criteria.

6. A method for performing chromatic dispersion (CD) compensation, comprising:
calculating a zero-forcing filter with a number of taps (n) required to nullify a chromatic dispersion frequency response of an optical channel;
truncating the number of taps in the zero-forcing filter to a number equal to (n−x), where x is an integer greater than 0;
using the truncated zero-forcing filter to form a CD compensation filter;
converting an analog electrical signal to a digital signal at an initial sampling frequency $F_1$;
resampling the digital signal at a sampling frequency $F_2$, lower in frequency than $F_1$;
supplying the resampled digital signal to the CD compensation filter;
the CD compensation filter supplying a CD compensated signal at the $F_2$ sampling frequency;
resampling the CD compensated input signal at a sampling frequency $F_3$, greater than or equal to the $F_2$ sampling frequency; and
using an adaptive equalizer to process the resampled CD compensated signal.

7. The method of claim 6 further comprising:
defining a modeling criterion comprising minimum mean-square error (MMSE) or effective channel delay spread; and
wherein truncating the number of taps in the zero-forcing filter comprises selecting (n−x) taps the meet the defined modeling criteria.

8. The method of claim 6, wherein
calculating the zero-forcing filter comprises:
partitioning the chromatic dispersion frequency response of the optical channel into a plurality of constituent chromatic dispersion responses; and
calculating a zero-forcing filter corresponding to each of the plurality of constituent chromatic dispersion responses;

truncating the number of taps in the zero-forcing filter comprises truncating the number of taps in each of the plurality of zero-forcing filters; and forming the CD compensation filter comprises:
forming a CD compensation filter for each of the plurality of truncated tap zero-forcing filters; and
cascading the plurality of CD compensation filters.

9. A chromatic dispersion (CD) compensation system, comprising:
a CD compensation filter comprising:
an input to accept a resampled digital signal;
a zero-forcing filter with a number of taps (n−x), truncated from a zero-forcing filter calculated with the number of taps (n) required to nullify a chromatic dispersion frequency response of an optical channel, where x is an integer greater than 0; and
an output to supply a CD compensated signal;
an analog-to-digital converter (ADC) having an input to accept an analog electrical signal and an output to supply a digital signal at an initial sampling frequency $F_1$;

a first sampling device having an input to accept the digital signal, and an output to supply the resampled digital signal at a sampling frequency $F_2$, lower in frequency than $F_1$;

a second sampling device having an input to accept the CD compensated signal and an output to supply a resampled CD compensated signal at a sampling frequency $F_3$, greater than or equal to the $F_2$ sampling frequency; and an adaptive equalizer having an input to accept the resampled CD compensated signal and an output to supply an equalized signal.

10. The method of claim 9, wherein the (n−x) number of CD compensation filter taps is chosen using a modeling criterion comprising minimum mean-square error (MMSE) or effective channel delay spread.

11. The system of claim 9, wherein the n number of taps for the zero-forcing filter is calculated by partitioning the chromatic dispersion frequency response of the optical channel into a plurality of constituent chromatic dispersion responses, and calculating a zero-forcing filter corresponding to each of the plurality of constituent chromatic dispersion responses; and the CD compensation filter is a cascaded series of CD compensation filters, each associated with a corresponding zero-forcing filter having a truncated number of taps.

12. A chromatic dispersion (CD) compensation system, comprising:

a CD compensation filter comprising:
  an input to accept a resampled digital signal;
  a zero-forcing filter with a number of taps (n−x), truncated from a zero-forcing filter calculated with the number of taps (n) required to nullify a chromatic dispersion frequency response of an optical channel, where x is an integer greater than 0; and
  an output to supply a CD compensated signal;

wherein the n number of taps for the zero-forcing filter is calculated by partitioning the chromatic dispersion frequency response of the optical channel into a plurality of constituent chromatic dispersion responses, and calculating a zero-forcing filter corresponding to each of the plurality of constituent chromatic dispersion responses; and the CD compensation filter is a cascaded series of CD compensation filters, each associated with a corresponding zero-forcing filter having a truncated number of taps.

13. The system of claim 12 further comprising:

an analog-to-digital converter (ADC) having an input to accept an analog electrical signal and an output to supply a digital signal at an initial sampling frequency $F_1$;

a first sampling device having an input to accept the digital signal, and an output to supply the resampled digital signal at a sampling frequency $F_2$, lower in frequency than $F_1$;

a second sampling device having an input to accept the CD compensated signal and an output to supply a resampled CD compensated signal at a sampling frequency $F_3$, greater than or equal to the $F_2$ sampling frequency; and an adaptive equalizer having an input to accept the resampled CD compensated signal and an output to supply an equalized signal.

14. The method of claim 12, wherein the (n−x) number of CD compensation filter taps is chosen using a modeling criterion comprising minimum mean-square error (MMSE) or effective channel delay spread.

* * * * *